A. E. McCOLL.
PROTECTIVE DEVICE FOR ALTERNATING CURRENT ELECTRIC SYSTEMS.
APPLICATION FILED DEC. 31, 1919.

1,393,228.

Patented Oct. 11, 1921.

INVENTOR
Albert Edward McColl
By B. Singer
Atty

A. E. McCOLL.
PROTECTIVE DEVICE FOR ALTERNATING CURRENT ELECTRIC SYSTEMS.
APPLICATION FILED DEC. 31, 1919.

1,393,228.

Patented Oct. 11, 1921.
7 SHEETS—SHEET 2.

INVENTOR
Albert Edward McColl,
By B. Singer, Atty.

A. E. McCOLL.
PROTECTIVE DEVICE FOR ALTERNATING CURRENT ELECTRIC SYSTEMS.
APPLICATION FILED DEC. 31, 1919.
1,393,228.
Patented Oct. 11, 1921.
7 SHEETS—SHEET 3.
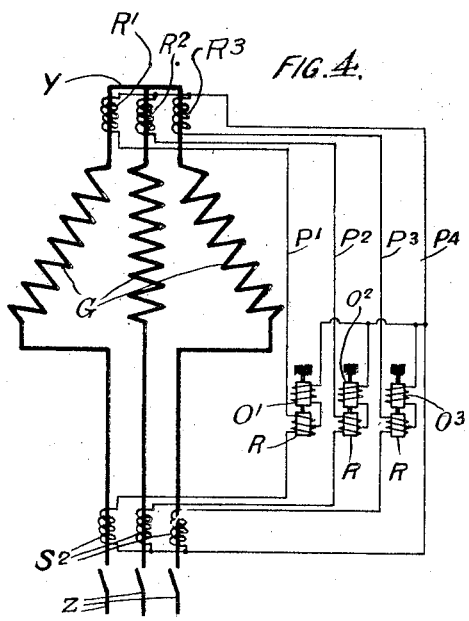
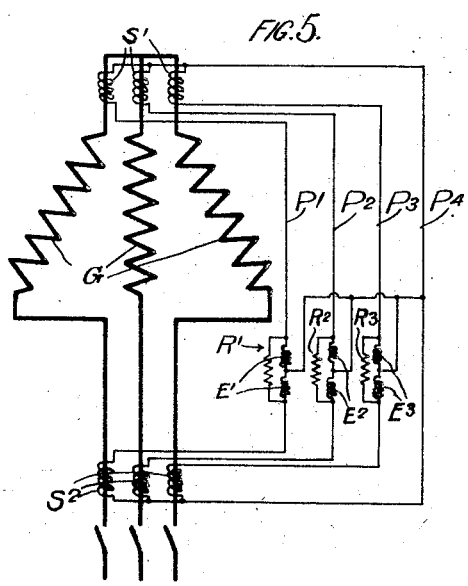

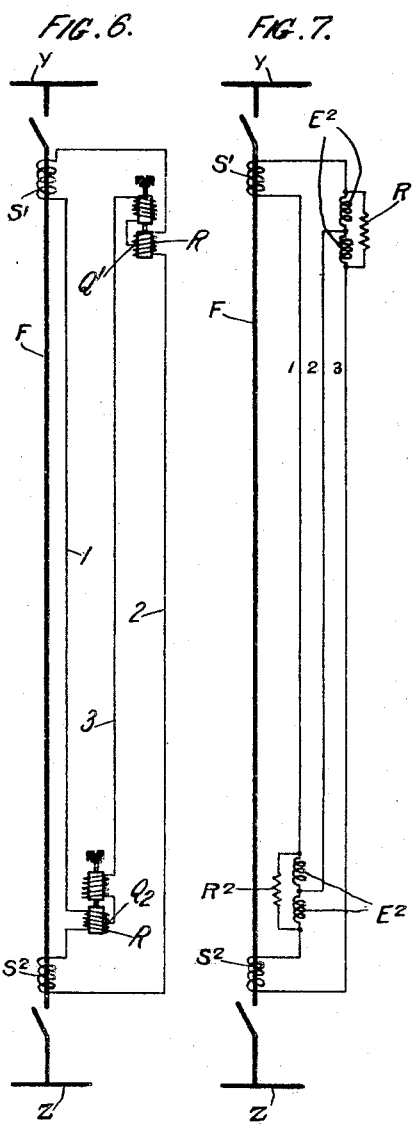

A. E. McCOLL.
PROTECTIVE DEVICE FOR ALTERNATING CURRENT ELECTRIC SYSTEMS.
APPLICATION FILED DEC. 31, 1919.

A. E. McCOLL.
PROTECTIVE DEVICE FOR ALTERNATING CURRENT ELECTRIC SYSTEMS.
APPLICATION FILED DEC. 31, 1919.

A. E. McCOLL.
PROTECTIVE DEVICE FOR ALTERNATING CURRENT ELECTRIC SYSTEMS.
APPLICATION FILED DEC. 31, 1919.
1,393,228.
Patented Oct. 11, 1921.
7 SHEETS—SHEET 7.
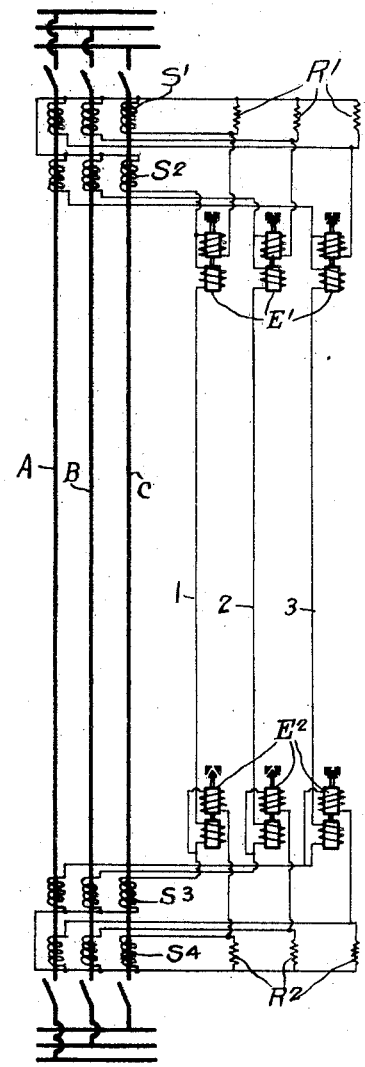
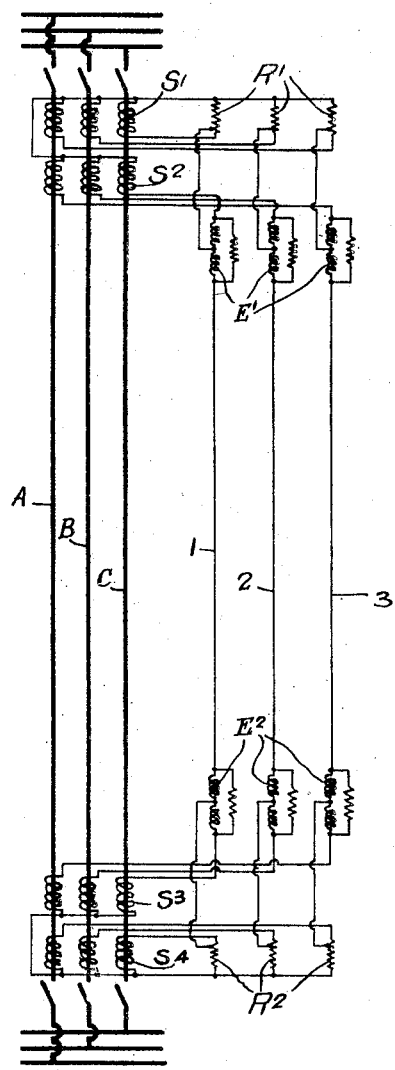
INVENTOR
Albert Edward McColl,
By B. Singer, Atty.

UNITED STATES PATENT OFFICE.

ALBERT EDWARD McCOLL, OF DUMBARTON, SCOTLAND, ASSIGNOR OF ONE-HALF TO THE GENERAL ELECTRIC COMPANY LIMITED, OF BIRMINGHAM, ENGLAND.

PROTECTIVE DEVICE FOR ALTERNATING-CURRENT ELECTRIC SYSTEMS.

1,393,228.      Specification of Letters Patent.      Patented Oct. 11, 1921.

Application filed December 31, 1919. Serial No. 348,676.

(GRANTED UNDER THE PROVISIONS OF THE ACT OF MARCH 3, 1921, 41 STAT. L., 1313.)

*To all whom it may concern:*

Be it known that I, ALBERT EDWARD McCOLL, a citizen of the United Kingdom of Great Britain and Ireland, and resident of 1 Levengrove Terrace, Dumbarton, Scotland, have invented certain new and useful Improvements in Protective Devices for Alternating-Current Electric Systems, (for which I have filed an application in Great Britain and Ireland, Nov. 14, 1917, Patent No. 119,937,) of which the following is a specification, such as will enable others skilled in the art to which it appertains to make and use the same.

This invention relates to improved means of protecting alternating current electric systems, and has for its object to effect the prompt disconnection of faulty apparatus or circuits on such systems.

Certain protective means of known type require the maintenance of a balance between the two ends or sides of circuits or apparatus to be protected. With such known protective means a portion of current is taken from each end or side of the protected circuit or apparatus and the two portions compared in a relay device in a well-known manner.

As has been found in practice, great difficulty is experienced in maintaining a balance; more especially is this evident when the protected apparatus while normally healthy has momentarily to furnish or carry current several hundred per cent. in excess of its normal value.

For example, in practice, the series transformers placed in each end or side of the protected circuit or apparatus may balance to within, say, $\frac{1}{2}\%$ of the current in the circuit or apparatus; this unbalanced portion will normally be insufficient to operate the relay devices. On large power and distribution systems a portion of the network may break down, and large instantaneous values of current may flow over sound sections of the network. Such instantaneous values, may, perhaps, be 100 times greater than the normal full load rating of the healthy section. It will be evident that, if the unbalanced portion of $\frac{1}{2}\%$ be multiplied 100 times, the current which flows becomes large enough to operate the relay devices; in fact, the unbalanced portion would, in the present example, be equivalent to 50% of the full load rating of the sound section. The protective devices, to remain inoperative and stable under such conditions, require to have large current settings; this, however, means that the relay devices have to be adjusted, so that they operate only with large fault currents. Similar conditions hold in the operation of generators and transformers which can supply very large momentary currents to faults beyond their own terminals.

The purpose of this invention therefore is to provide systems of automatic protection which are not affected by those differences of balance, the protective devices, however, admitting of a sensitive setting, while an accurate balance of forces between the two ends or sides of a protected feeder, circuit, winding or piece of apparatus is not necessary.

To this end, therefore, the present invention consists in the employment of systems of protection comprising relay devices which remain inoperative or biased until the current flowing into either end or side of a feeder, circuit, winding or piece of apparatus exceeds the current flowing out from the other end or side of said feeder, circuit, winding or piece of apparatus by a predetermined percentage, the percentage bias being unaffected by change in the direction of the flow of power; but, if current should flow simultaneously into each end or side of said feeder, circuit, winding or piece of apparatus the protective devices immediately operate independently of the percentage bias.

I am aware that applications of the biased principle have already been made but these arrangements apply to the protection of parallel feeders. It is to be understood, however, that parallel feeder protection does not come within the scope of the present invention.

Figs. 4 and 5 illustrate applications of the invention to three phase generators.

Figs. 6, 7, 8, 9, 10, 11 and 12 show applications of the invention to feeders or interconnectors.

Figs. 13 and 14 show the manner in which the schemes illustrated in Figs. 7 and 12 are applied to a three-phase feeder.

Figure 1:
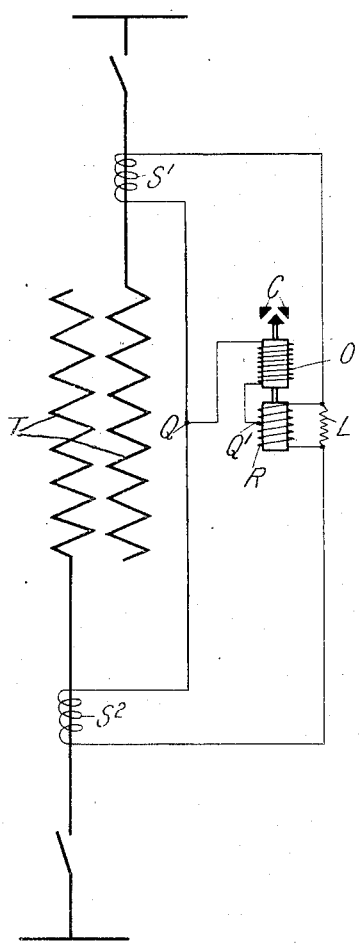
Figures 1, 2 and 3 show the invention applied to single phase transformers.

Referring to Fig. 1, O and R represent, respectively, the operating and restraining coils of a biased relay, in which the coil O pulls the relay upward toward the contacts C, the coil R restraining or tending to prevent movement of the relay. T represents a transformer in the primary and secondary of which are placed series transformers $S_1$ and $S_2$, the secondaries of said series transformers being connected so as to form a circulating current system. The restraining coil R is connected in series with the circulating current system, the operating coil O being connected to equipotential points Q and $Q_1$. One equipotential point $Q_1$, it will be observed, is midway along the restraining coil R. The coil R may, however, consist of a double winding, the equipotential point in this case being the junction of the double winding. The restraining coil R may comprise say 10% of the turns comprising the operating coil O. Normally the current from the series transformers circulates through the restraining coil R; the operating coil O, being connected to equipotential points, carries no current. Should a fault develop on the transformer and the transformer still continue to deliver power from its secondary side, current will commence to flow in one series transformer, say $S_1$, in excess of that flowing in $S_2$. This excess current will flow through the operating coil O and one half of the restraining coil R. The ampere turns of the operating coil due to its greater number of convolutions will gain on and ultimately overcome those of the restraining coil, thus causing the relay to operate when the excess current flowing through the operating coil exceeds by a certain predetermined percentage the current circulating through the series transformer $S_2$. By way of example, if the load conditions on the transformer T were such that ten amperes circulate through the series transformers $S_1$ and $S_2$, and the operating coil of the relay were to comprise 100 turns and the restraining coil ten turns, the ampere turns of the operating coil would approximately balance those of the restraining coil if one series transformer, say $S_1$, were to circulate 11.06 amperes through the circuit. It will be understood that the secondary of the transformer has the same number of turns as the primary. Through the operating coil 1.06 amperes would flow, its ampere turns being $1.06 \times 100 = 106$, and the ampere turns of the restraining coil would equal $(10 \times 10) + (1.06 \times 5) = 105.3$, the percentage bias or restraint being 10.6%. Should a fault develop on the transformer when it is supplying in parallel with other transformers, power may flow equally into the faulty transformer from each end, and the series transformers will in this case circulate all their current through the operating coil O, and each half of the restraining coil R in opposite directions, the magnetic effect of the latter mentioned coil being thereby canceled, the relay becoming instantly operative without the percentage bias to disconnect the faulty transformer by tripping the controlling switches on both the primary and the secondary sides of the transformer. The tripping circuits are not shown as these may be effected in a manner well understood.

The relay may take the form of a pivoted beam relay in which the operating coil is at one end and the restraining coil at the other end of the beam. The relay may also take other forms in which the same principles are involved. One such other form may be, for example, the induction type relay wherein the operating coil tends to rotate a disk carrying or actuating tripping contacts in one direction, the restraining coil tending to give movement in the other direction limited by a stop. It is intended that in the construction shown in Fig. 1 the restraining coil R should be constructed so as to constitute a number of turns in excess of that required for normal bias, a portion of the current being shunted through the reactance or resistance "L"; the latter, if it be made variable, forming a simple and convenient means of varying the bias.

Figure 2:
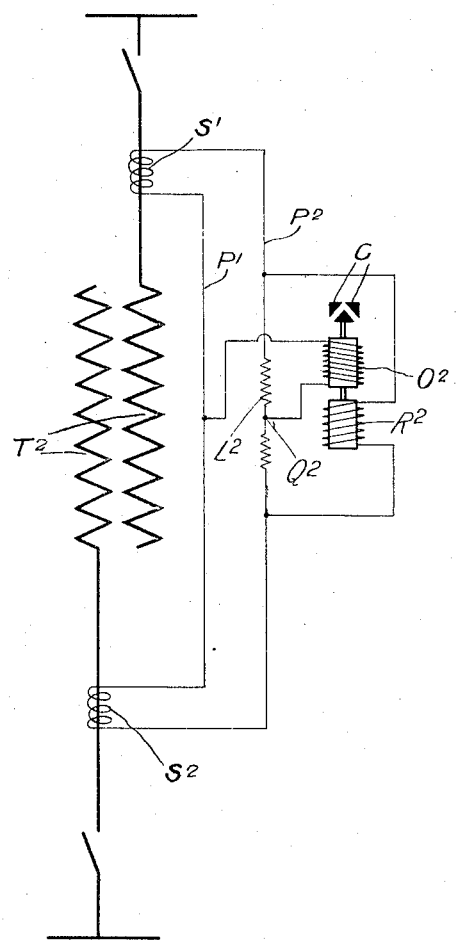

Fig. 2 shows a modification of the previous arrangement applied to the protection of a main transformer $T_2$, the series transformers which are connected in the primary and secondary sides of the main transformer being indicated by $S_1$ and $S_2$. The secondary windings of the series transformers are connected in series with one another and circulate their output through one another and the resistance $L_2$ by means of the pilot wires $P_1$ and $P_2$. A portion of this current which circulates over the pilot wire is, due to the resistance $L_2$, caused to flow through the restraining coil $R_2$ of the relay. The degree to which it is required to bias the relay may be controlled by varying the proportion which the resistance $L_2$ bears to the resistance of the restraining coil $R_2$. The operating coil $O_2$ is connected across the pilot wires $P_1$ and $P_2$ one point being approximately the midpoint $Q_2$ of the resistance $L_2$. The operating coil $O_2$, depending on the degree of forcible restraint required, may have ten times as many turns as the restraining coil $R_2$. In this arrangement likewise we have assumed that the cores of the relay are pulled downward by the restraining coil $R_2$ and upward against the contacts C by the operating coil $O_2$. It will be evident that the operating principle in this modification is similar to that described in connection with Fig. 1 as the equipotential point is transferred from the center of the restraining coil to the midpoint of the resistance $L_2$.

Figure 3:
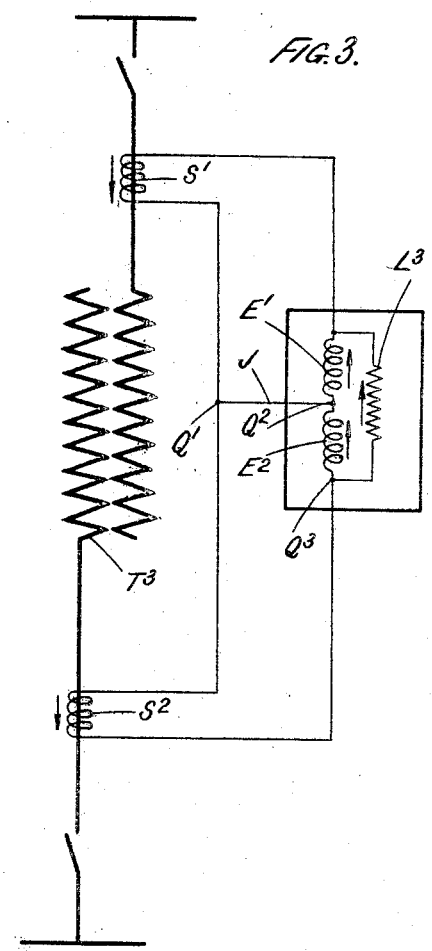

A further biased arrangement is shown in Fig. 3 in which there is employed a type of relay which is responsive to a change in the direction of current flow through one of its elements. Such relays are generally termed reverse current relays. $E_1$ and $E_2$ constitute the two elements of a reverse current relay, such elements having approximately equal resistance or equal reactance. The series transformers $S_1$ and $S_2$ are connected so as to form a circulating current system, the current circulating through both elements of the relay connected in series, and also through the resistance or reactance $L_3$ in parallel with the relay elements. A lead J connects equipotential points $Q_1$ and $Q_2$.

Normally, as the current circulates straight through the elements $E_1$ and $E_2$ as shown by the arrows, the relay remains inoperative or restrained.

Should, however, a fault develop on the transformer $T_3$ when it is supplying power to a network, the fault component of the current will be added to the load current, and one series transformer, say $S_1$, will now carry current in excess of that carried by the other transformer $S_2$. This excess current will take the path through the lead J and the element $E_1$ of the relay, but without altering the relative direction of the current flowing in either element of the relay. Now, as the fault current gradually increases in $S_1$, the excess current will increase through the lead J and the element $E_1$, and at the same time the current which flows from the series transformer $S_2$ gradually increases through the resistance $L_3$ and diminishes through the element $E_2$. As the excess current increases, a point is reached where all the current from the series transformer $S_2$ flows through the resistance $L_3$ and all the excess current from the transformer $S_1$ flows through the lead J and the element $E_1$, no current flowing in either direction through the element $E_2$. As the excess current increases still further through the lead J, a portion now commences to flow through the element $E_2$ in the opposite direction and thence through the resistance $L_3$. That is to say, when the current flowing in the series transformer $S_1$ exceeds by a certain percentage the current flowing in the series transformer $S_2$, the excess current flowing through the lead J has two parallel paths to follow, one path being through the element $E_1$, and the other path being through the element $E_2$ in the opposite direction, thence through the resistance $L_3$, reversal of flow through the element $E_2$ constituting the condition necessary for operation of the relay. By way of example, it may be assumed that the resistance $L_3$ has an ohmic value equal to the combined resistance of the elements $E_1$ and $E_2$, and that the load conditions are such that the series transformers $S_1$ and $S_2$ circulate one ampere through the system. Should a fault develop on the transformer $T_3$ such that three amperes now flow through the secondary of the series transformer $S_1$, two amperes will flow through the lead J and the element $E_1$. One ampere which circulates through the series transformer $S_2$ will flow through the resistance $L_3$. As $L_3$ has an ohmic value double that of $E_1$ and it is traversed by half the current, the drop across $L_3$ and $E_1$ will be of similar value; consequently, the point $Q_2$ will be at the same potential as the point $Q_3$ and no current will flow in either direction through the element $E_2$. If the current flowing in the transformer $S_1$ increase beyond three amperes, current will now commence to flow in the element $E_2$ in the reverse direction, causing the relay to operate. In the foregoing example it has been shown that the relay remains inoperative until the current flowing in one transformer $S_1$ becomes three times as great as that flowing in the other transformer $S_2$; in other words a restraint or bias is imposed on the relay until the fault current exceeds the load current by 200%. Any degree of bias may be obtained by varying the ratio of the resistance of the relay elements and the shunting resistance $L_3$. For example, if the ohmic value of the elements $E_1$ and $E_2$ be ten times greater than that of the resistance $L_3$, the bias or restraint is 20% if it be twenty times greater, the bias or restraint becomes 10%. Should a fault develop on the transformer $T_3$ when supplying in parallel with other apparatus, and should current flow into the faulty transformer from both sides, the series transformers $S_1$ and $S_2$ will now circulate the sum of their currents through the lead J, such current dividing and flowing through the elements $E_1$ and $E_2$ in opposite directions, the relay becoming instantly operative without the percentage bias to disconnect the faulty transformer, by tripping the controlling switches on both the primary and secondary sides.

Fig. 4 shows the arrangement described with reference to Fig. 1 applied to the protection of a three phase generator G. Series transformers $S_1$ and $S_2$ are connected in the star-point end Y and the busbar end Z respectively of the generator windings. These transformers are connected so that they circulate their current through one another and over the pilot wires $P_1$, $P_2$ and $P_3$, the pilot wire $P_4$ being employed to connect the neutral point of each group of series transformers together. The restraining coils $R_1$, $R_2$ and $R_3$ of the relays are connected in series with the pilot wires $P_1$, $P_2$ and $P_3$ and the operating coils $O_1$, $O_2$ and $O_3$ are connected from the midpoint of each restraining coil to the pilot wire $P_4$. This protective arrangement will be readily understood from the descriptive matter relating to Fig. 1. It will be apparent that the arrangement shown in Fig. 2 can be applied to the protection of a three phase generator or transformer in a manner similar to that indicated in Fig. 4. To those skilled in the art the method of applying the protective scheme shown in Fig. 1 to a three phase transformer will be readily understood.

In Fig. 5 there is shown the application of the arrangement, described with reference to Fig. 3, to the protection of a three phase generator G. Series transformers $S_1$ and $S_2$ are connected in circuit with the generator windings at the star-point and busbar ends respectively. The secondaries of these transformers are connected so that they circulate their current through one another by means of the pilot wires $P_1$, $P_2$ and $P_3$, and through the dynamometer relays $E_1$, $E_2$ and $E_3$, a portion also flowing through the shunting resistances $R_1$, $R_2$ and $R_3$. The method of operation of this protective scheme will be readily followed from the descriptive matter relating to Fig. 3. The means of applying this protective arrangement to a three phase transformer will be readily understood by those skilled in the protective gear art.

Fig. 6 shows the arrangement described with reference to Fig. 1 applied to the protection of a single phase feeder F. Series transformers $S_1$ and $S_2$ are connected in circuit with the feeder or interconnector at the ends Y and Z respectively. The secondaries of the transformers $S_1$ and $S_2$ are connected so that they circulate their current through one another and over the pilot wires 1 and 2, this circulating current traversing the restraining coil R of each relay. The operating coil of each relay is connected to an equipotential point at each end of the circulating current system by means of the pilot lead 3. These equipotential points are the mid points of the restraining coil.

It will be evident that the equipotential points $Q_1$ and $Q_2$ might be grounded, and the pilot wire 3 omitted, the earth acting as the necessary conductor. Should either series transformer due to fault conditions contribute to the pilot wire system current to excess of that contributed by the other series transformer, this excess current will flow through the pilot wire 3 and the operating coil of each relay. If the current were to flow into the feeder equally from each end, the transformers would send the sum of their currents over the lead 3, such sum dividing and flowing equally in opposite directions through the restraining coils, thereby canceling the bias. In this and the following diagrams, the tripping circuits from the relays to the controlling switches are omitted as these may be connected in a well known manner, it being understood, however, that each relay trips the feeder switch at the end toward which it is placed.

Fig. 7 shows an arrangement similar to that described with reference to Fig. 3 applied to the protection of a single phase feeder F. $S_1$ and $S_2$ indicate series transformers connected at the ends Y and Z of the feeder F. The secondaries of these transformers are connected so that they circulate their current over the pilot wires 1 and 2 and through the dynamometer relays $E_1$ and $E_2$. A portion of this circulating current flows through the resistances $R_1$ and $R_2$ which shunt the relays $E_1$ and $E_2$. A pilot wire 3 connects equipotential points at each end of the pilot wire system together. These equipotential points are found at the junction of the fixed and moving coils of the dynamometer type relays $E_1$ and $E_2$.

The means by which the percentage bias or restraint is obtained in this arrangement will be readily understood from the descriptive matter relating to Fig. 3. It will also be understood that this restraint is operatve only when current flows in at one end in excess of that flowing out at the other end. This bias or restraint would be omitted in the event of a fault occurring in the feeder F of such dimensions as to demand a simultaneous flow in of current at the ends Y and Z. In this case the transformers $S_1$ and $S_2$ would now oppose one another and the sum of their currents would traverse the equipotential pilot wire 3, thence traversing the two coils of each of the relays $E_1$ and $E_2$ in reverse direction, this reversal constituting the condition necessary for operation of the relay.

Figure 8:
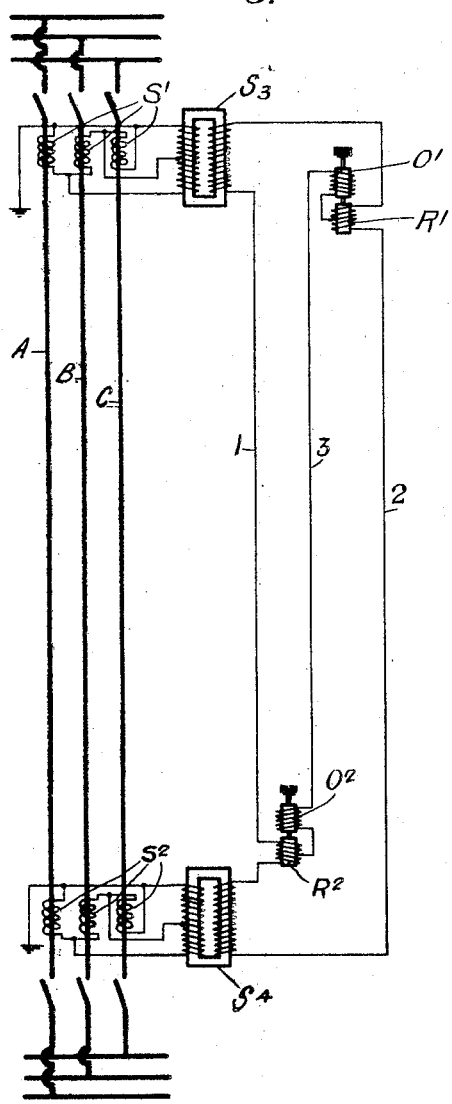

Fig. 8 shows the manner in which the single phase arrangement described with reference to Fig. 6 would be applied to the protection of a three phase feeder. A, B and C represent the phases of a three phase feeder. $S_1$ and $S_2$ represent the series transformers placed at each end thereof. The transformers $S_1$ and $S_2$ however, instead of circulating their current directly into the pilot wire system, circulate it through the whole of the primary of what I prefer, for distinctive purposes, to term summation transformers $S_3$ and $S_4$. The secondaries of the summation transformers $S_3$ and $S_4$ give up single phase current, these secondaries being connected in series with one another so that this current circulates over the pilot wires 1 and 2 thereby traversing the restraining coils $R_1$ and $R_2$ of each relay. Equipotential points at each end of the pilot wire system are connected together by the pilot wire 3, these equipotential points being found at the midpoint of the restraining coils $R_1$ and $R_2$. In series with the equipotential pilot wire 3 the operating coil $O_1$ and $O_2$ of each relay is connected. The connection employed for the series transformers $S_1$ and $S_2$ permits of current being delivered into the primary of each summation transformer under all fault conditions on the phases A, B and C. This increased current will apply either with faults to ground on individual phases or faults between any two of the phases A, B and C or equally between the three phases A, B and C. Under any condition increased current will be delivered into the pilot wire system by one summation transformer thereby upsetting the symmetrical loading of the circuit so that current will divide over the equipotential pilot wire 3 and through the operating coils $O_1$ and $O_2$ of the relays. This spill-over current causes the relays to operate by virtue of the larger number of turns with which the operating coil is wound as compared with the restraining coil of its particular relay.

Figure 9:
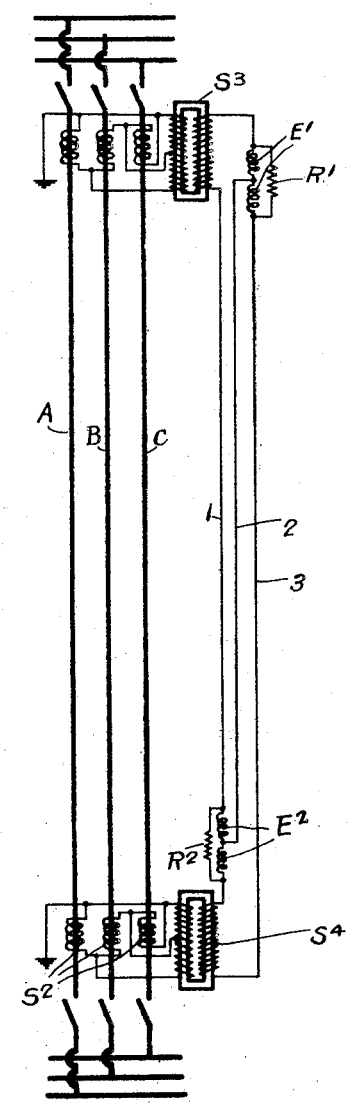

Fig. 9 shows the arrangement employing summation transformers and dynamometer type relays applied to a three phase feeder. A, B and C indicate the phases of a three phase feeder or interconnector, the series transformers which are connected in circuit with the phases of said feeder or interconnector being referred to as $S_1$ and $S_2$. $S_3$ and $S_4$ represent summation transformers and the pilot wires are indicated by 1, 2 and 3. $E_1$ and $E_2$ indicate the relays. The resistances shunting the relays are shown as $R_1$ and $R_2$. From the description given in connection with Fig. 8, the operation of this arrangement will be readily followed.

Figure 10:
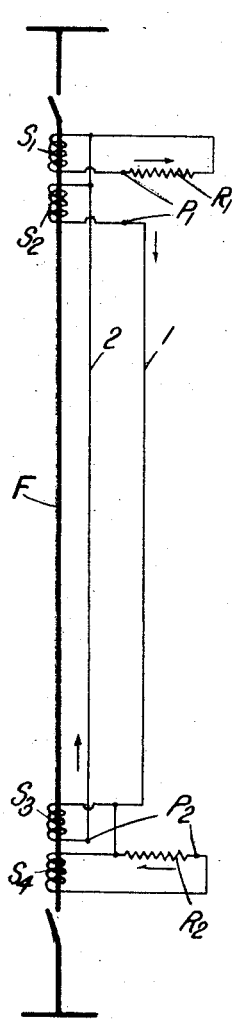
Figure 11:
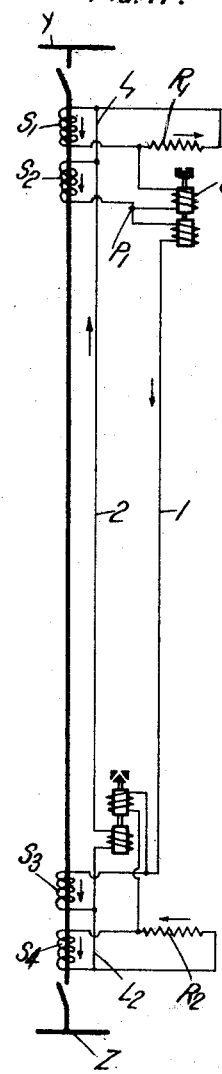
Figure 12:
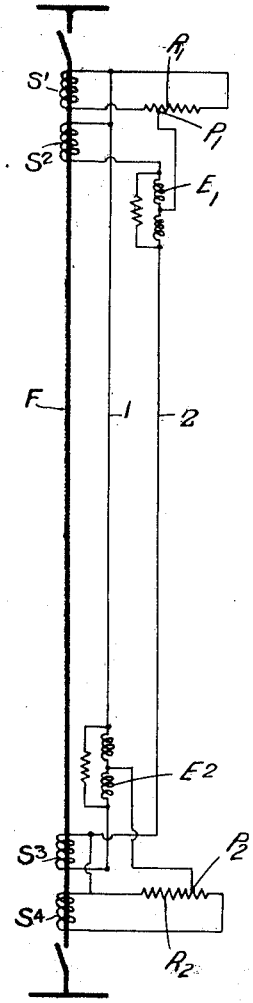

Figs. 10, 11 and 12 show another modification of the invention applied to a single phase system. Referring to Fig. 10 which is included for explanatory purposes, the series transformers at each end of the feeder F may comprise two separate transformers, or preferably one transformer with two secondary windings.

One transformer such as $S_2$ is connected in series with the transformer $S_3$ at the other end of the feeder by means of the pilot wires 1 and 2. Starting from the transformer $S_2$ in the direction of the arrow, we find as we progress along the pilot wire 1 that there is a continuous fall of potential until the transformer $S_3$ is reached, the potential being raised again by the series transformer $S_3$. Progressing along the pilot wire 2 a similar continuous fall of potential is found until the transformer $S_2$ is reached. If we have a resistance such as $R_1$, which has an ohmic value similar to that of the pilot wire 1, and should current be circulated through this resistance from the transformer $S_1$, having a value equal to that flowing in the pilot wire 1, the resistance operates as would another pilot wire running in parallel with the pilot wire 1. As the pilot wire and the resistance have equal ohmic values and are traversed by similar current values, it will be apparent that an infinite number of points at equal potential must exist between the two circuits. Similarly, equipotential points exist between the resistance $R_2$ and the pilot wire 2; two such points are shown at $P_1$ and $P_2$. It will be obvious that the resistance of the pilot wires and the parallel circuits being equal is merely illustrative; as, for example, there may be circulated five times the current through the resistance that normally flows in the pilot wires but its ohmic value would require to be one fifth that of the pilot wires, the same drop in potential, however, existing in the two circuits. Fig. 11 shows the same series transformer arrangement in conjunction with the mechanically balanced relay. Should a fault develop on the feeder when it is carrying load, the power supply being from say the end Y, the major portion of the excess current from the transformer $S_2$ will flow through the operating coil O of the relay at the end Y of the feeder. For example, the excess current at the point $P_1$ follows two paths. One path is through the operating coil O of the relay, thence through the resistance $R_1$, completing its circuit by means of the lead $L_1$. The other portion of the excess current will flow along the pilot wire 1, thence through the operating coil of the relay at the end Z, the resistance $R_2$, the lead $L_2$ and the pilot wire 2. As one path has three times the resistance of the other path, it follows that the major portion of the excess current will flow through the operating coil of the relay at the end Y, and the remainder through the operating coil of the relay at the end Z. Should the feeder become faulty, and power flow equally into it from both ends, no current will flow through the pilot wires or restraining coils of the relays, but the whole current from the transformers at each end of the feeder will flow through the operating coils of the respective relays, the percentage bias being thereby canceled. The arrangement shown in Fig. 11, it will be observed, is slightly different from that shown in Fig. 10. The operating coil of the relay at the end Y is connected to equipotential points of the series transformer $S_1$ and $S_2$, such points being at maximum potential. The relay at the end Z has its operating coil connected to points of the other transformer circuits which are at zero potential.

Fig. 12 shows the adaptation of the dynamometer type relay, described with reference to Fig. 3, to this arrangement. The reference letter F indicates the feeder, 1 and 2 the pilot wires, $S_1$, $S_2$, $S_3$ and $S_4$ the series transformers, $E_1$ and $E_2$ the relays and $R_1$ and $R_2$ the duplicate circuits. It will be noted that the junction of the two coils of each relay is connected to a point at equal potential on each duplicate circuit. These points are shown at $P_1$ and $P_2$ on the duplicate circuits.

Figs. 13 and 14 show the manner in which the schemes illustrated in Figs. 11 and 12 would be applied to a three phase feeder, the phases being indicated by the reference letters A, B and C, the series transformers by $S_1$, $S_2$, $S_3$ and $S_4$, the pilot wires by 1, 2 and 3, the duplicate circuits by $R_1$ and $R_2$, and the relays by $E_1$ and $E_2$. In Figs. 13 and 14 the series transformers are connected in star, one set of transformers at each end of the pilot wires circulating their output through the duplicate circuits $R_1$ and $R_2$, while the other sets circulate their currents over the pilot wires 1, 2 and 3. The summation transformer described with reference to Figs. 8 and 9 is herein distinguished from the arrangement described in U. S. Patent 1,310,821. The distinguishing feature of the arrangements shown in Figs. 8 and 9 of the present invention lies in the employment of connections which always permit of increased current being given by the secondaries of the summation transformers under all fault conditions on the phases of a three phase circuit. Other well known arrangements employing similar transformers are operative only on faults to ground on three phase systems and are not operative when the fault occurs directly between either two, or three phases of a three phase circuit.

The present invention which has for its distinguishing feature a hindering of the movement of the relay devices by means of the load current flowing in current transformers is herein distinguished from other well known protective systems which also employ pilot wires and in which a direct and accurate balance is required between the various series transformers and the resistances of the pilot wires to prevent premature and incorrect operation of the protective devices.

It will be evident that with all the various arrangements of the invention power may flow in either direction through the protected apparatus without altering the biased characteristics of the protective devices. If the flow of power should reverse through one end or side of the protected apparatus or circuit in such wise that power now flows equally into the apparatus or circuit, no bias is necessary for this condition and the protective devices become instantly operative to disconnect the faulty apparatus or circuit.

Although the invention has been described with reference to feeders or circuits, generators and static transformers, it will be understood that forms of electrical apparatus operating under similar conditions may be similarly protected; the term "transformer" being intended to include apparatus of the rotary type.

What I claim and desire to secure by Letters Patent is:—

1. In combination, an alternating current circuit, series transformers placed at each end thereof, pilot wires and relays, operation of which is forcibly prevented until the current flowing into said circuit exceeds the current flowing out by an amount which is a definite percentage independently of the quantity and direction of the flow of power.

2. In combination, an alternating current circuit, series transformers placed at each end thereof, interconnecting pilot wires and mechanically balanced relays, the restraining coil of which is shunted by a resistance and is energized by the current which normally flows in the pilot wires, the operating coil being connected to equipotential points, one such point being midway along the restraining coil.

3. In combination an alternating current circuit, series transformers placed at each end thereof, interconnecting pilot wires and a mechanically balanced relay, the restraining coil of which is shunted by a resistance and is energized by the current which normally flows in the pilot wires, the operating coil being connected to equipotential points, one such point being midway along the shunting resistance.

4. In combination an alterating current circuit, series transformers placed at each end thereof, interconnecting pilot wires and a reverse current relay, the coils of which are connected in series with the pilot wires and shunted by a resistance, the junction of said coils being connected to an approximately equipotential point on the circulating current system, the ohmic ratios of the shunting resistance and the relay coils determining the percentage bias or degree of forcible restraint.

5. In combination, a polyphase alternating current, series transformers placed at each end thereof, interconnecting pilot wires, relays and summation transformers, the primary of which is traversed by the currents which flow in the series transformers on the phase of a polyphase system, said series transformers being connected in such relation to the summation transformers that the secondary of the said summation transformers supply increased current to the pilot wires under all fault conditions arising on the feeder or circuit, such increased current operating the protective devices.

6. In combination an alternating current circuit, series transformers placed at each end thereof, interconnecting pilot wires over which current normally circulates, relays and duplicate circuits through which a portion of the transformer current normally flows, said duplicate circuits having a resistance which may be equal to, greater or less than that of the corresponding pilot wires so that a similar drop in potential is obtained between the duplicate and pilot wire circuits, the operating coils of the relay devices being connected to equipotential points of the duplicate and pilot wire circuits.

In witness whereof I have hereunto set my hand in presence of two witnesses.

ALBERT EDWARD McCOLL.

Witnesses:
 ISABEL ROLLO,
 KATE FOTHERINGHAM.